US012723381B2

(12) United States Patent
Moran et al.

(10) Patent No.: US 12,723,381 B2
(45) Date of Patent: Sep. 1, 2026

(54) WATER LEAK DETECTION SYSTEMS AND METHODS FOR AN INTERNAL CABIN OF A VEHICLE

(71) Applicant: THE BOEING COMPANY, Arlington, VA (US)

(72) Inventors: Thomas Joseph Moran, Seattle, WA (US); Wade Bruce Stoelting, Arlington, WA (US); Morten Lau Hansen, Mikilteo, WA (US); Jon Feroy, Edgewood, WA (US); Sabyasachi Basu, Kingston, WA (US); Jacob Bakich, Bothell, WA (US); Kevin Vasko, Owens Cross Roads, AL (US); Cory Christopher Haven, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 338 days.

(21) Appl. No.: 18/448,269

(22) Filed: Aug. 11, 2023

(65) Prior Publication Data

US 2025/0052042 A1 Feb. 13, 2025

(51) Int. Cl.

| | |
|---|---|
| ***E03B 7/00*** | (2006.01) |
| ***E03B 7/07*** | (2006.01) |
| *B64D 11/02* | (2006.01) |
| *B64D 11/04* | (2006.01) |

(52) U.S. Cl.
CPC .............. *E03B 7/003* (2013.01); *E03B 7/071* (2013.01); *B64D 11/02* (2013.01); *B64D 11/04* (2013.01)

(58) Field of Classification Search
CPC ......... E03B 7/003; E03B 7/071; B64D 11/02; B64D 11/04
USPC ............................................... 137/460, 487.5
See application file for complete search history.

(56) References Cited

U.S. PATENT DOCUMENTS

| | | | | |
|---|---|---|---|---|
| 5,971,011 | A * | 10/1999 | Price | F17D 5/02 137/460 |
| 10,558,228 | B1 * | 2/2020 | Chavez | G01F 15/066 |
| 11,530,531 | B2 * | 12/2022 | Poojary | E03B 7/072 |
| 2006/0009928 | A1 * | 1/2006 | Addink | E03B 7/071 702/50 |
| 2009/0083906 | A1 | 4/2009 | Kurita | |

(Continued)

FOREIGN PATENT DOCUMENTS

| | | |
|---|---|---|
| JP | 2003311135 | 11/2003 |
| WO | WO 2020059661 | 3/2020 |

*Primary Examiner* — Minh Q Le
(74) *Attorney, Agent, or Firm* — Joseph M. Butscher; Carroll, Hoette & Butscher, LLC

(57) ABSTRACT

A leak detection system and method for an internal cabin of a vehicle include a sensing device configured to detect one or both of water flow or water pressure within a water delivery conduit that is configured to deliver water to one or more water-drawing components within one or more areas of the internal cabin. The sensing device is configured to detect one or both of the water flow or the water pressure into the one or more water-drawing components. A control unit is in communication with the sensing device. The control unit is configured to monitor one or both of the water flow or the water pressure as detected by the sensing device, and determine a presence of a leak in relation to the one or more water-drawing components based on one or both of the water flow or the water pressure.

23 Claims, 6 Drawing Sheets

(56) References Cited

U.S. PATENT DOCUMENTS

| | | | | |
|---|---|---|---|---|
| 2010/0125941 | A1 | 5/2010 | Shin | |
| 2010/0235978 | A1 | 9/2010 | Guttau | |
| 2010/0258204 | A1* | 10/2010 | Cipolla | G01F 1/05 137/460 |
| 2016/0289929 | A1* | 10/2016 | Guy | G01M 3/2807 |
| 2017/0131174 | A1* | 5/2017 | Enev | G01M 3/2815 |
| 2017/0292893 | A1* | 10/2017 | Bunker | G01M 3/26 |
| 2018/0127957 | A1* | 5/2018 | Enev | G01M 3/2815 |
| 2018/0238765 | A1 | 8/2018 | Gramespacher | |
| 2020/0133315 | A1* | 4/2020 | Rasmussen | E03B 7/071 |
| 2020/0393324 | A1* | 12/2020 | Rudd | G01M 3/2807 |
| 2021/0018393 | A1* | 1/2021 | Downey | E03B 7/071 |
| 2022/0073206 | A1 | 3/2022 | Murayama | |
| 2022/0404228 | A1 | 12/2022 | McIntosh | |
| 2023/0101694 | A1* | 3/2023 | Poojary | G01M 3/2815 700/282 |
| 2023/0124088 | A1* | 4/2023 | Wallace | E03B 7/08 137/12 |
| 2023/0160772 | A1* | 5/2023 | Agarwal | E03B 7/071 73/164 |
| 2024/0183140 | A1* | 6/2024 | John | B64D 11/02 |
| 2024/0337554 | A1* | 10/2024 | McIntosh | B64F 5/60 |

* cited by examiner

WATER LEAK DETECTION SYSTEMS AND METHODS FOR AN INTERNAL CABIN OF A VEHICLE

FIELD OF THE DISCLOSURE

Examples of the present disclosure generally relate to water leak detection systems and methods, such as for lavatories and galleys within an internal cabin of a vehicle, such as a commercial aircraft.

BACKGROUND OF THE DISCLOSURE

Commercial aircraft are used to transport passengers and/or goods between various locations. A typical commercial aircraft includes one or more lavatories and one or more galleys within an internal cabin.

Water supply systems provide water to the lavatories and the galleys within internal cabins, such as through various conduits, tubes, pipes, and/or the like. As can be appreciated, a water leak onboard an aircraft can pose various safety issues. There are multiple areas throughout an airplane, such as within a lavatory, where a leak can occur.

A known system for detecting leaks includes multiple devices installed within a water system at inflow and outflow locations. Separate and distinct devices at both inflow and outflow locations increases overall complexity, and can reduce reliability. Further, such systems can be susceptible to increased installation complexity, and increased maintenance costs.

SUMMARY OF THE DISCLOSURE

A need exists for a system and a method for effectively detecting water leaks within an internal cabin of an aircraft, such as in relation to a lavatory, galley, or the like within the internal cabin. Further, a need exists for an efficient and effective system and method for detecting leaks within an area, such as within an internal cabin of a vehicle.

With those needs in mind, certain examples of the present disclosure provide a leak detection system for an internal cabin of a vehicle. The leak detection system includes a sensing device configured to detect one or both of water flow or water pressure within a water delivery conduit that is configured to deliver water to one or more water-drawing components within one or more areas of the internal cabin. The sensing device is configured to detect one or both of the water flow or the water pressure into the one or more water-drawing components. A control unit is in communication with the sensing device. The control unit is configured to monitor one or both of the water flow or the water pressure as detected by the sensing device, and determine a presence of a leak in relation to the one or more water-drawing components based on one or both of the water flow or the water pressure.

The one or more areas can include one or both of a galley or a lavatory.

In at least one example, the sensing device is disposed on or within the water delivery conduit upstream from the one or more water-drawing components.

In at least one example, the sensing device includes one or both of a flow sensor or a pressure sensor.

In at least one example, the sensing device includes an ultrasonic sensor disposed on or within the water delivery conduit.

In at least one example, the control unit is further configured to output an alert signal to a user interface in response to determining the presence of the leak.

In at least one example, the control unit is further configured to automatically shut off flow of water to the one or more water-drawing components in response to determining the presence of the leak.

In at least one example, the control unit is further configured to determine the presence of a leak based on one or both of the water flow or the water pressure in relation to one or more time thresholds related to normal use of the one or more water-drawing components.

In at least one example, the leak detection system is devoid of device that is configured to detect flow or water out of the one or more water-drawing components. The leak detection system is devoid of a sensing device downstream from the one or more water-drawing components.

In at least one example, the control unit is configured to determine total area flow rate (TAFR), possible leakage flow rate (PLFR), total possible leakage quantity (TPLQ), maximum allowable leakage quantity (MALQ), minimum measurable flow rate (MMFR), and active accumulated flow quantity (AAFQ).

The control unit can be an artificial intelligence or machine learning system.

The sensing device can include a first pressure transducer configured to detect water pressure within the water delivery conduit, a flow transducer configured to detect water flow within the water delivery conduit, and a second pressure device configured to detect water pressure within the water delivery conduit. The sensing device can further include a solenoid valve configured to be operated by the control unit to selectively open and close the water delivery conduit. In at least one example, the sensing device is configured to track changes in flow rates, such as flow rate increases or decreases.

Certain examples of the present disclosure provide a vehicle including an internal cabin having one or more areas, one or more water-drawing components within the one or more areas, a water delivery conduit configured to deliver water to the one or more water-drawing components, and a leak detection system, as described herein.

Certain examples of the present disclosure provide a leak detection method for an internal cabin of a vehicle. The leak detection method includes detecting, by a sensing device, one or both of water flow or water pressure within a water delivery conduit that is configured to deliver water to one or more water-drawing components within one or more areas of the internal cabin, wherein said detecting comprises detecting one or both of the water flow or the water pressure into the one or more water-drawing components; monitoring, by a control unit in communication with the sensing device, one or both of the water flow or the water pressure as detected by the sensing device; and determining, by the control unit, a presence of a leak in relation to the one or more water-drawing components based on one or both of the water flow or the water pressure.

In at least one example, said determining includes determining total area flow rate (TAFR), possible leakage flow rate (PLFR), total possible leakage quantity (TPLQ), maximum allowable leakage quantity (MALQ), minimum measurable flow rate (MMFR), and active accumulated flow quantity (AAFQ).

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a leak detection system configured for use within an internal cabin of a vehicle, such as a commercial aircraft. The leak detection system can include or otherwise provide a pressurized water system circuit breaker device that protects vehicle structure and electrical components from water system leakage. The leak detection system provide a unitary smart device (such as a control unit in communication with one or more sensors) that is configured to measure water system inflow and system pressure and employs data analytics-based algorithms to distinguish leakage outflows from normal operation outflows anywhere downstream of a location of a water-drawing component. The unitary device reduces complexity, increases reliability, and simplifies installation and maintenance. In at least one example, the system provides a shut-off function without crew action along with a system pressure-hold check to confirm leakage. A user interface can be used to provide an alert when a potential leakage occurs, and allow for a reset function.

Figure 1:
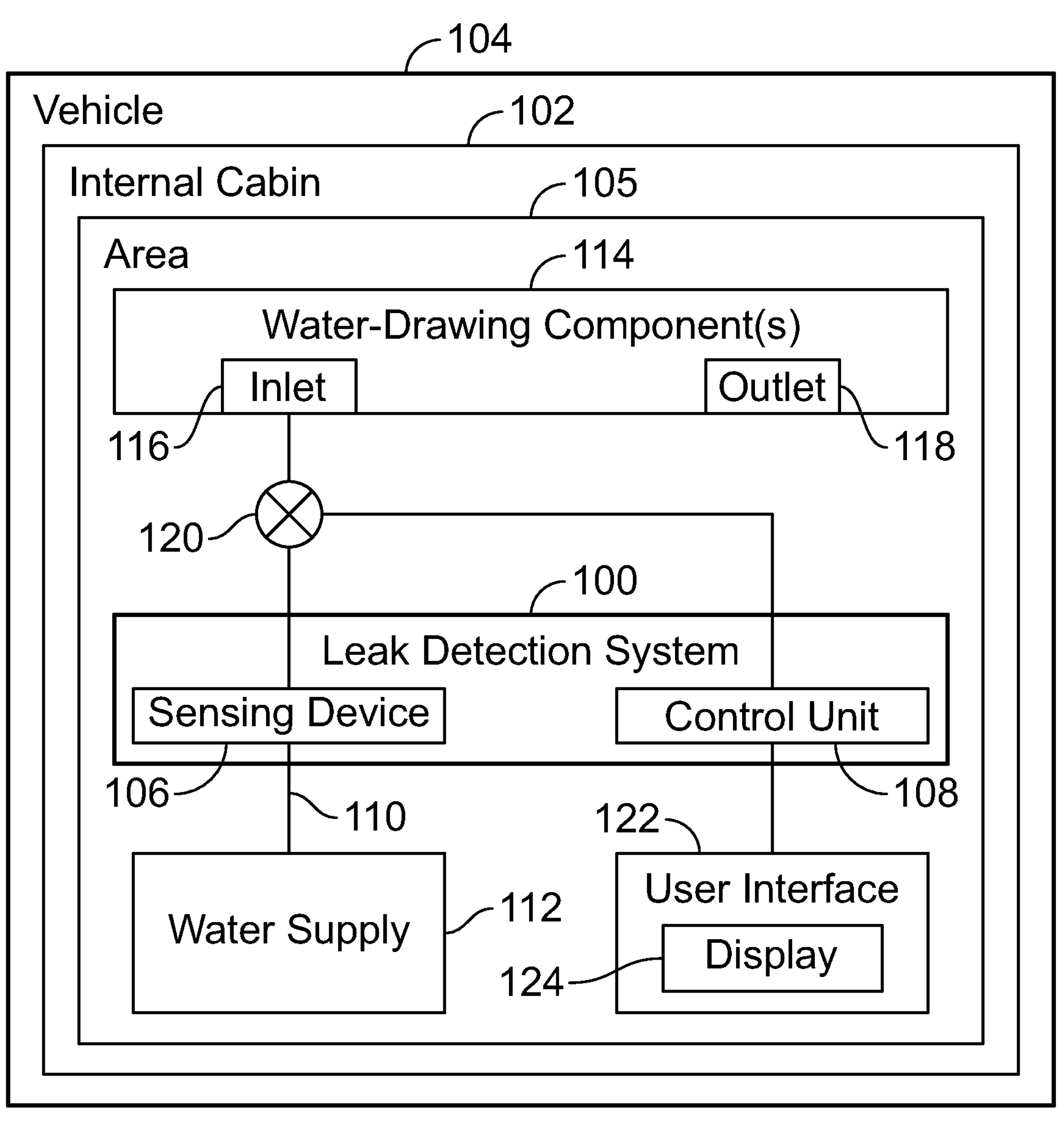
FIG. 1 illustrates a schematic block diagram of a leak detection system within an internal cabin of a vehicle, according to example of the present disclosure.

FIG. 1 illustrates a schematic block diagram of a leak detection system 100 within an area 105 of an internal cabin 102 of a vehicle 104, according to example of the present disclosure. The leak detection system 100 includes a sensing device 106 in communication with a control unit 108, such as through one or more wired or wireless connections. The sensing device 106 and the control unit 108 can be co-located, and provided in a single housing, for example. As another example, the sensing device 106 can be separate and remote from the control unit 108.

The sensing device 106 is configured to detect fluid flow and/or pressure in relation to a water delivery conduit 110 that receives water from a water supply 112 within the internal cabin 102. The internal cabin 102 includes one or more areas 105 that include one or more water-drawing components 114. In at least one example, the sensing device 106 is disposed on or within the water delivery conduit 110. For example, the sensing device 106 can include one or more flow sensors and/or one or more pressure sensors. The sensing device 106 can be or otherwise include an ultrasonic sensor disposed on or within the water delivery conduit 110, and configured to detect fluid flow. The sensing device 106 can be or otherwise include a pressure sensor disposed on or within the water delivery conduit 110, and configured to detect fluid pressure. The sensing device 106 can be or otherwise include a mechanical device, such as a water wheel, disposed within the water delivery conduit 110. The sensing device 106 can be or otherwise include an acoustic sensor disposed on or within the water delivery conduit 110.

The water delivery conduit 110 can be or otherwise include one or more tubes, pipes, ducts, and/or the like. The water supply 112 can be a water tank within the internal cabin 102, such as disposed underneath a passenger seating area.

One or more water-drawing components 114 are in fluid communication with the water delivery conduit 110. The water-drawing component(s) 114 are configured to receive water from the water supply 112 through the water delivery conduit 110. Each water-drawing component 114 includes an inlet 116 that receives water from the water delivery conduit 110, and an outlet 118 through which water flows out of the water-drawing component 114. A valve 120 is disposed within the water delivery conduit 110 upstream from the inlet 116. In at least one example, the valve 120 is a mechanical valve, such as can be manually operated. As another example, the valve 120 is an electromechanical solenoid valve. In at least one example, the valve 120 can be an electromechanical solenoid valve that can also be manually operated. The valve 120 can be selectively opened so that water flows into the water-drawing component 114 from the water delivery conduit 120, and closed to prevent water from flowing into the water-drawing component 114.

The sensing device 106 is disposed on or within the water delivery conduit 110 downstream from the water supply 112, and upstream from the water-drawing component(s) 114. As such, the sensing device 106 is configured to detect water flow into the water-drawing component(s) 114. The sensing device 106 detects flow of water from the water supply 112 to the water-drawing component(s) 114. In this manner, the sensing device 106 detects in-flow of water to the water-drawing component(s) 114.

A first component (such as the sensing device 106) that is upstream from a second component (such as the water-drawing component(s) 114) receives water from the water supply 112 before the second component. Conversely, the second component that is downstream from the first component receives water from the water supply after the first component.

In at least one example, the control unit 108 is in communication with the valve 120, such as through one or more wired or wireless connections. The control unit 108 is configured to control operation of the valve 120.

The control unit 108 can also be in communication with a user interface 122, such as through one or more wired or wireless connections. The user interface 122 includes a display, such as a monitor, electronic screen, television, one or more lights, a light emitting diode (LED) panel or screen, and/or the like. In at least one example, the user interface 122 is a computer workstation within the internal cabin 102. As another example, the user interface 122 can be a hand-held device, such as a smart phone, smart tablet, or the like. The user interface 122 can be configured to provide a touchscreen interface, such as through the display 124. The control unit 108 can be configured to show status indications on the display 124.

The area 105 can be any area within the internal cabin 102 that includes a water-drawing component 114. For example, the area 105 can be one or more galleys within the internal cabin 102. As another example, the area 105 can be one or more lavatories within the internal cabin 102. As another example, the area 105 can be one or more monuments (such as a closet). Examples of the water-drawing components 114 include a faucet, a drinking fountain, a coffee maker, a steam oven, a water boiler, a shower, a toilet, a bidet, and/or the like. Each area 105 can include one or more water-drawing components 114. In at least one example, the sensing device 106 is disposed on or within the water delivery conduit 110 that provides water to plural water-drawing components 114 within one or more areas 105 of the internal cabin 102. As another example, the sensing device 106 is disposed on or within the water delivery conduit 110 that provides water to a single water-drawing component 114.

In operation, the control unit 108 is configured to determine a leak based on flow of water into the water-drawing component(s) 114. For example, the sensing device 106 monitors the flow of water into the inlet 116 of the water-drawing component(s) 114. The control unit 108 includes or is otherwise in communication with a memory that stores pre-programmed instructions for determining the presence of a leak based on the flow of water into the water-drawing component(s) 114. In at least one example, the leak detection system 100 is devoid of a device that is configured to detect flow of water out of the water-drawing component(s) 114. For example, in at least one example, the leak detection system 100 is devoid of a sensing device downstream from an outlet 118 of the water-drawing component(s) 114. Instead, the control unit 108 determines a presence of a leak based on the flow of water into (that is, in-flow) the water-drawing component(s) 114, but not out of the water-drawing component(s) 114. In at least one example, the control unit 108 does not monitor flow of water out of the water-drawing component(s) 114. As such, the control unit 108 does not detect water leaks based on water flowing out of (that is, out-flow) the water-drawing component(s) 114.

In at least one example, the water-drawing component(s) 114 typically draws an amount of water for a predetermined time threshold, such as five seconds, ten seconds, twenty seconds, or the like. The control unit 108 can be pre-programmed based on the predetermined time threshold. That is, the predetermined threshold can be stored in a memory of the control unit 108. The sensing device 106 detects the flow of water into the water-drawing component(s) 114. The control unit 108 receives one or more signals from the sensing device 106 regarding the flow of water into the water-drawing components(s) 114. If the control unit 108 determines that the flow of water is less than the predetermined time threshold for water flow, the control unit 108 determines that there is no water leak. If, however, the control unit 108 determines that the flow of water exceeds the predetermined time threshold for water flow, the control unit 108 can determine that there is a water leak. As such, the control unit 108 may then output an alert signal to the user interface 122. The alert signal is shown on the display 124 as indicating a potential leak. The valve 120 can then be closed to shut off the flow of water to the water-drawing component(s) 114.

In at least one example, the alert signal, such as can be shown on the display 124, indicates the presence of a water leak in relation to the water-drawing component(s) 114. As another example, the alert signal indicates that a trouble-shooting operation is to be performed to check the water-drawing component(s) 114 for any leaks. That is, the alert signal can indicate the actual presence of a leak, and/or the potential presence of a leak, such that the water-drawing component(s) 114 are to be checked.

The control unit 108 can provide various status indications on the display 124. For example, the control unit 108 can provide a visual message, a colored illumination, a flashing illumination, and/or the like on the display 124 regarding a leak in relation to the water-drawing component(s) 114.

In at least one example, in response to determining that a leak has occurred, such as by determining that the flow of water to the water-drawing component(s) 114 exceeds the predetermined time threshold, the control unit 108 can automatically operate the valve 120 to a closed position, thereby shutting off the flow of water to the water-drawing component(s) 114.

In at least one example, in response to determining that the flow of water to the water-drawing component(s) 114 exceeds the predetermined time threshold, the control unit 108 may then determine if water flow to the water-drawing component(s) 114 continues for an additional confirmation time threshold, such as an additional five seconds, ten seconds, twenty seconds, or the like. Such an additional confirmation time threshold accounts for instances when a water-drawing component 114 is used longer than normal, such as if an individual uses a faucet to wash hands for a longer period than usual. In this example, if the control unit 108 determines that the water flow to the water-drawing component(s) 114 is more than the predetermined time threshold, but less than the additional confirmation time threshold, the control unit 108 determines that there is no water leak, and takes no further action. If, however, the control unit 108 determines that the water flow to the water-drawing component(s) 114 exceeds the predetermined time threshold and the additional confirmation time threshold, the control unit 108 determines that a water leak is (or may be) present, and can then output the alert signal to the user interface 122 and/or automatically operate the valve 120 to shut off water flow to the water-drawing component(s) 114.

In at least one other example, the sensing device 106 can be used to determine water pressure in relation to the water delivery conduit 110. In this example, the control unit 108 can determine normal or abnormal water flow in relation to pressure of water being delivered to the water-drawing component(s) 114. For example, normal use of the water-drawing component(s) 114 exhibits a predetermined pressure. If the pressure remains past the predetermined time threshold, the control unit 108 can determine a presence of an actual or potential leak, as described above. As another example, the control unit 108 is configured to determine the presence of a leak based on a pattern of water pressure. For example, if the water pressure remains at a level below a predetermined level after an initial pressure spike, the control unit 108 can determine the presence of a water leak.

As described herein, the control unit 108 is configured to determine a presence of a water leak based on water flow and/or water pressure of water flowing into the water-drawing component(s) 114. The control unit 108 determines the presence of the water leak by monitoring one or both of water flow and/or water pressure upstream from the water-drawing component(s) 114 (instead of downstream from the water-drawing component(s) 114). The leak detection system 100 includes the sensing device 106 upstream from the water-drawing component(s) 114. In at least one example, the leak detection system 100 is devoid of a sensing device downstream from the water-drawing component(s) 114, thereby reducing system complexity, cost, and overall weight. Alternatively, the leak detection system 100 can include a sensing device 106 downstream from the water-drawing component(s) 114.

The vehicle 104 can be a commercial aircraft. Optionally, the leak detection system 100 can be used with various other vehicles, such as a land-based vehicle (such as a bus, train, or the like), a water-based vehicle (such as a passenger cruise ship), a spacecraft, or the like. In at least one other example, the leak detection system 100 can be used with fixed structures, such as residential or commercial buildings.

As described herein, examples of the present disclosure provide the leak detection system 100 for the internal cabin 102 of the vehicle 104. The leak detection system 100 includes the sensing device 106 configured to detect one or both of water flow or water pressure within a water delivery conduit 110 that is configured to deliver water to one or more water-drawing components 114 within one or more areas 105 of the internal cabin 102. The control unit 108 is in communication with the sensing device 106. The control unit 108 is configured to monitor one or both of the water flow or the water pressure as detected by the sensing device 106, and determine a presence of a leak in relation to the one or more water-drawing components 114 based on one or both of the water flow or the water pressure.

In at least one example, the control unit 108 is configured to determine the presence of a leak based on the water flow and/or the water pressure in relation to one or more time thresholds related to normal use of the one or more water-drawing components 114. The time thresholds can be predetermined and stored in a memory of the control unit 108. The normal use is a predetermined period of time for known, standard times of drawing of water of a water-drawing component 114. For example, a faucet within a lavatory can be typically used to output water for a period of up to 45 seconds. As such, the predetermined period of time for known use of the faucet does not exceed 45 seconds. The predetermined period of time for known use can be greater or less than 45 seconds. Such is merely an example, and is not limiting. The predetermined period of time for a known use can be different for different water-drawing components 114.

Figure 2:
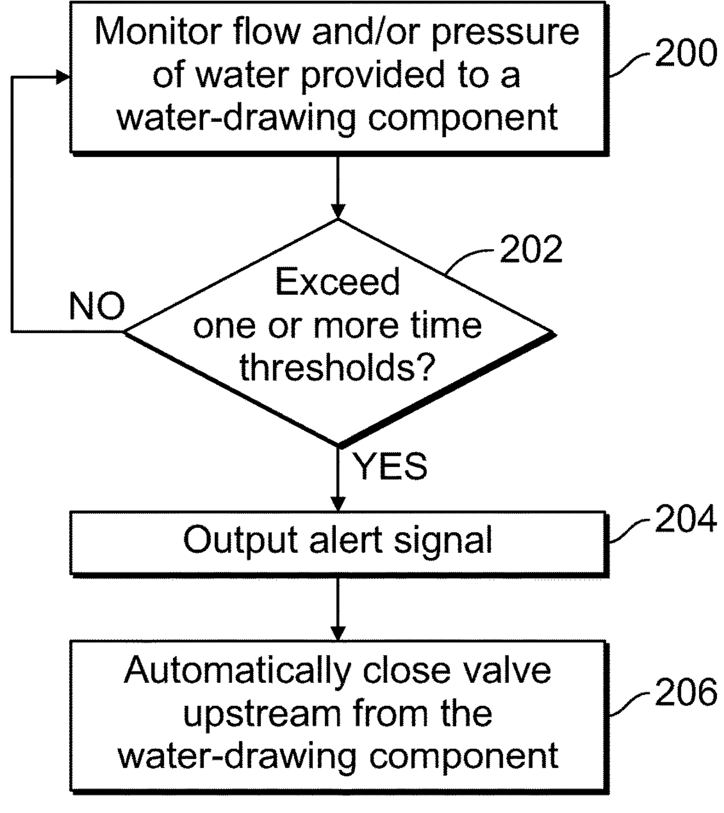
FIG. 2 illustrates a flow chart of a method, according to an example of the present disclosure.

FIG. 2 illustrates a flow chart of a method, according to an example of the present disclosure. Referring to FIGS. 1 and 2, at 200, the control unit 108 monitors flow and/or pressure of water provided to the water-drawing component(s) 114. At 202, the control unit 108 determines if the flow and/or pressure exceeds one or more time thresholds, which can include predetermined upper limits for normal use of the water-drawing component(s) 114. If the flow and/or pressure into the water-drawing component (s) 114 does not exceed the time threshold(s) at 202, the method returns to 200.

If, however, the control unit 108 determines that the flow and/or pressure exceeds the time threshold(s) at 202, the method proceeds to 204, at which the control unit 108 outputs the alert signal on the display 124. The method may then proceed to 206, at which the control unit 108 automatically closes the valve 120, which is upstream from the water-drawing component(s) 114.

In at least one example, the control unit 108 is configured to determine the presence of a leak when the flowrate of water into the water-drawing component(s) 114 is always greater than zero for a predetermined time threshold. Such an example can be used when there are a small number of water-drawing components 114. In this example, the control unit 108 sets a maximum timer (based on the predetermined time threshold) that is reset each time total area flow rate returns to zero. If the timer expires (that is, the control unit 108 determines that the predetermined time threshold has been exceeded), the control unit 108 then outputs the alert signal on the display 124, and executes a pressure check mode, in which the shut-off valve 120 is closed and the water pressure to the water-drawing component(s) 114 is monitored. If the water pressure does not hold steady, the control unit 108 outputs an alert signal indicating that a water leak is present, and leaves the shut-off valve 120 in the closed position. If pressure holds, the control unit 106 outputs an alert signal indicating that the water system is operating normally and opens the shut-off valve 120.

In at least one example, a maximum allowable leakage quantity is for an entire downstream system. In at least one example, one pressure check mode can be a check of total pressure (static and dynamic) when flow in the system includes some normal outflows or only static pressure given that the system flow is below a preset flow limit that is well below the minimum normal operating flow, i.e., zero flow. If there is a system leak, once the shut off valve is closed, the static pressure level should decrease according to an exponential decay curve, which can be calculated to either ultimately decay to zero (that is, a leak) or not (that is, hold pressure and not a leak).

In at least one example, the control unit 108 may not store individual preset timers for each outflow. Instead, the control unit 108 can be configured to monitor system inflow rate as a function of time. In this example, the control unit 108 identifies all individual flowrate increase events as possible leak events at their initiation time and continuously calculates an associated area 105 total possible leakage quantity (TPLQ) as a function of time. When an outlet valve of the water-drawing component(s) 114 is closed, and the total inflow rate to the water-drawing component(s) 114 decreases, the individual flow increase/decrease event durations are multiplied by the flow rate and stored in the control unit 108 as the active accumulated flow quantity (AAFQ). In addition, the control unit 108 recalculates the TPLQ by subtracting the AAFQ value for the particular flow increase/decrease event. The applicable AAFQ number can be previously stored in the control unit 108 or newly added.

If the TPLQ exceeds a predetermined maximum allowable leakage quantity (MALQ), the control unit 108 outputs the alert signal on the display 124. The method may then proceed to 206, at which the control unit 108 automatically closes the valve 120, which is upstream from the water-drawing component(s) 114. Subsequently, the control unit 108 then executes a pressure check mode to confirm that leakage is present. For very small leakages, it is possible that the TPLQ may not exceed the MALQ during a single vehicle 104 operation cycle e.g., a flight. For these small leakages, the control unit 108 can use a timer function monitoring the absence of zero flow in the system and output to the display 124 that a post vehicle 104 operation cycle maintenance action is warranted.

As another example, the control unit 108 is configured to determine a maximum allowable flow quantity for each water-drawing component 114. The maximum allowable flow quantity may be predetermined and stored in a memory of the control unit 108. In this example, the control unit 108 monitors a flowrate increase of water to the water-drawing component(s) 114, and sets an individual timer (for example, a predetermined time threshold) based on the maximum allowable flow quantity. When an outlet valve of the water-drawing component(s) 114 is closed, and the total inflow to the water-drawing component(s) 114 decreases, the control unit 108 cancels the associated timer. If, however, an individual timer expires (that is, the predetermined time threshold is exceeded), the control unit 108 may then execute a pressure check mode and output an alert signal, as described.

As another example, the control unit 108 can be preprogrammed, either during production or after installation via the user interface 122, with known normal flow rates and durations. In at least one example, the control unit 108 can learn the normal flow rates and durations through artificial intelligence and machine learning. The control unit 108 can determine such from each flowrate decrease event. In this example, the control unit 108 can assume that that a leak will not occur prior to all known flow rates and durations based on pressure testing.

As an example, the area 105 can be a galley within the internal cabin. Numerous water-drawing components 114 can be used within the galley. The water-drawing components 114 can include a beverage maker, a water spigot, a coffee maker, and the like. The control unit 108 monitors water flow to the water-drawing components 114 over time. In at least one example, the control unit 108 monitors accumulated flow quantity of water from the water-drawing components 114 over time in relation to a predetermined value based on normal use for all of the water-drawing components 114 within the galley. For example, the data stored in a memory of the control unit 108 includes information that normal operation water use quantity of all water-drawing components 114 within the galley over a predetermined period of time is less than a predetermined amount. In at least one example, the predetermined amount is representative of a full flowrate generating failure in a supply line. If the control unit 108 detects flow quantity of water into the water-drawing components 114 that exceeds the predetermined amount in the predetermined time window, the control unit 108 outputs an alert signal indicating a potential leak that is to be checked. Optionally, the control unit 108 outputs the alert signal indicating an actual leak, and can optionally automatically shut off the delivery of water to the water-drawing components 114, such as by automatically operating one or more valves (for example, the valve 120).

In at least one example, when the detected flowrate increase is monitored as a possible leakage event, and there is a flowrate decrease later in time, the control unit 108 may determine that the earlier flowrate increase was not a leakage event. In this example, the control unit 108 tracks and adds up all the flowrate increases and decreases in real time to compute a total possible leakage quantity (TPLQ) which increases and decreases aligning with the flowrate increases and decreases into the area 105 over the time interval between zero flowrate events. If the TPLQ ever surpasses a predetermined or learned maximum allowable leakage quantity (MALQ) limit, then the control unit 108 determines that a leakage event has occurred. The maximum limit can be a function of the normal behavior of the equipment with valves (for example, flowrate and duration of valve is open) along with other leakage mitigation features of the vehicle 104.

In at least one example, when the control unit 108 detects that the flow of water to the water-drawing components 114 within the galley ceases (that is, the total possible leakage quantity resets to zero), the control unit can reset timers (regarding the predetermined time thresholds) and/or TPLQ values to zero), and the process repeats.

In at least one example, all or part of the systems and methods described herein may be or otherwise include an artificial intelligence (AI) or machine-learning system that can automatically perform the operations of the methods described herein. For example, the control unit 108 can be an artificial intelligence or machine learning system. These types of systems may be trained from outside information and/or self-trained to repeatedly improve the accuracy with how data is analyzed to determine the thresholds for normal use of water-drawing components 114. Over time, these systems can improve by determining leakages with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of the status of the water-drawing components 114. The training minimizes conflicts and interference by performing an iterative training algorithm, in which the systems are retrained with an updated set of data (for example, data received before, during, and/or after each use of a water-drawing component 114) and based on the feedback examined prior to the most recent training of the systems. This provides a robust analysis model that can better determine water leakage status in a cost effective and efficient manner.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 can be or include one or more processors that are configured to control operation thereof, as described herein.

The control unit(s), such as the control unit 108, are configured to execute a set of instructions that are stored in one or more data storage units or elements (such as one or more memories), in order to process data. For example, the control unit 108 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can provide external cache memory. The data stores of the disclosed systems and methods is intended to comprise, without being limited to, these and any other suitable types of memory.

The set of instructions can include various commands that instruct the control unit(s), such as the control unit 108, as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of examples herein can illustrate one or more control or processing units, such as the control unit 108. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the control unit 108, can represent processing circuitry such as one or more of a field programmable gate array (FPGA), application specific integrated circuit (ASIC), microprocessor(s), and/or the like. The circuits in various examples can be configured to execute one or more algorithms to perform functions described herein. The one or more algorithms can include aspects of examples disclosed herein, whether or not expressly identified in a flowchart or a method.

As used herein, the terms “software” and “firmware” are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
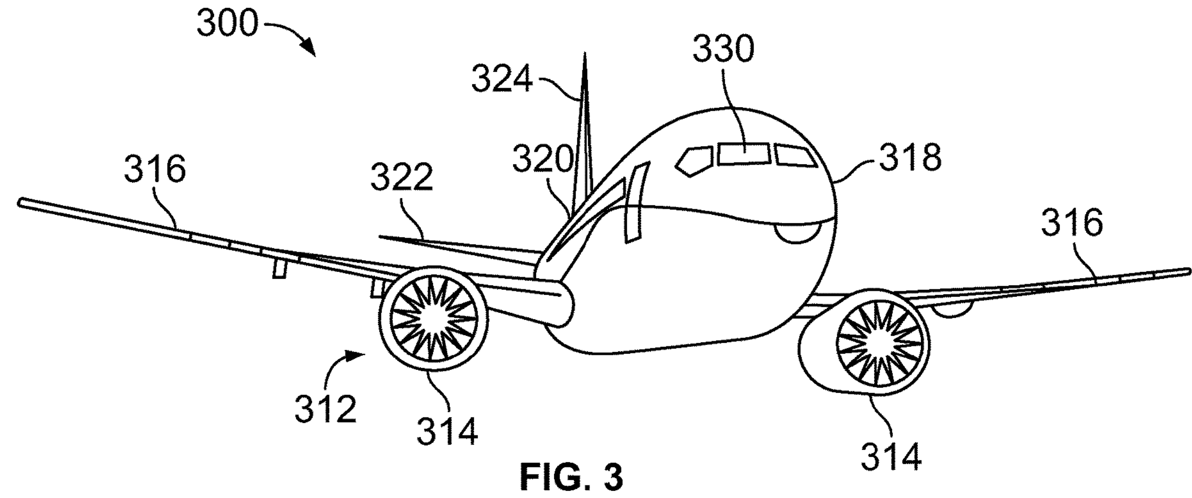
FIG. 3 illustrates a perspective front view of an aircraft, according to an example of the present disclosure.

FIG. 3 illustrates a perspective front view of an aircraft 300, according to an example of the present disclosure. The aircraft 300 is an example of the vehicle 104, shown in FIG. 1. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324.

The fuselage 318 of the aircraft 300 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 330 is an example of the internal cabin 102, shown in FIG. 1.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings.

Figure 4:
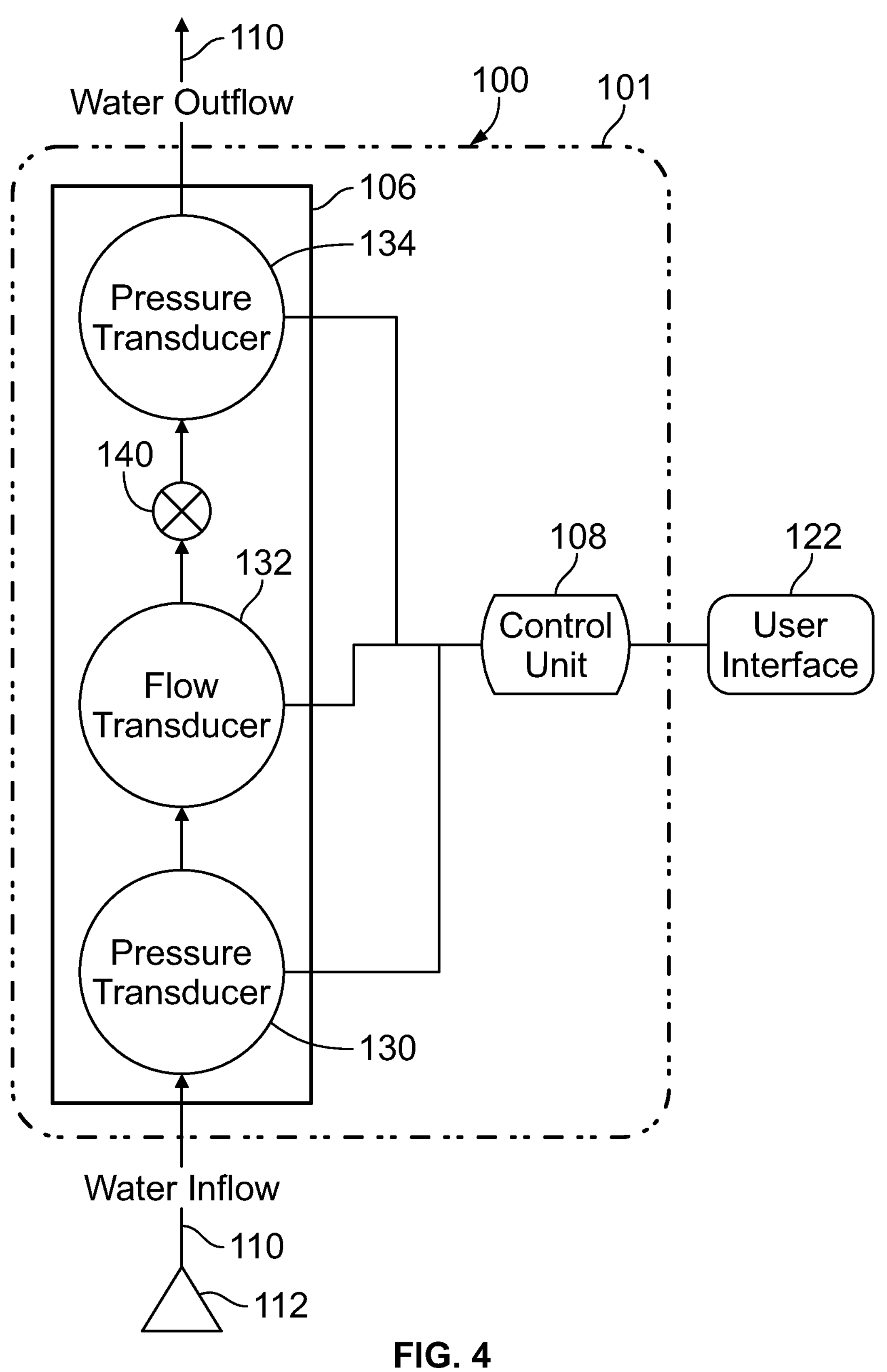
FIG. 4 illustrates a schematic diagram of a leak detection system, according to an example of the present disclosure.

FIG. 4 illustrates a schematic diagram of a leak detection system 100, according to an example of the present disclosure. Referring to FIGS. 1 and 4, the sensing device 106 is disposed on or within the water delivery conduit 110 between the water supply 112 and the water-drawing component(s) 114. The sensing device 106 is downstream from the water supply 112 and upstream from the water-drawing component(s) 114.

The sensing device 106 and the control unit 108 can be contained within a common housing 101. Optionally, the control unit 108 can be remote from the sensing device 106. For example, the user interface 122 can include the control unit 108.

In at least one example, the sensing device 106 includes a first pressure transducer 130 configured to detect water pressure within the water delivery conduit 110, a flow transducer 132 configured to detect water flow within the water delivery conduit 110, and a second pressure transducer 134 configured to detect water pressure within the water delivery conduit 110. The first pressure transducer 130 is upstream from the flow transducer 132, which is upstream from the second pressure transducer 134. Optionally, the sensing device 106 can include only one pressure transducer. As another example, the sensing device 106 can include only the flow transducer 132. As another example, the sensing device 106 can include one or both of the pressure transducers 130 and 134, but not the flow transducer 132. As another example, the sensing device 106 can include multiple flow transducers, and one or more pressure transducers. As another example, the sensing device 106 can include multiple flow transducers, and no pressure transducers.

The sensing device 106 can also include a solenoid valve 140 disposed on or within the water delivery conduit 110. The valve can optionally be a manual shut-off valve. As another example, there can be a manual shut-off valve and a solenoid valve. The control unit 108 can be configured to operate the solenoid valve 140 between open and closed positions, as described herein. That is, in at least one example, the control unit 108 is configured to operate the solenoid valve 140 to selectively open and close the water delivery conduit 110. In at least one example, the valve 140 may not be used. Instead, flow of water into the water-drawing component(s) 114 can be controlled via the valve 140 within the sensing device 106.

Figure 5:
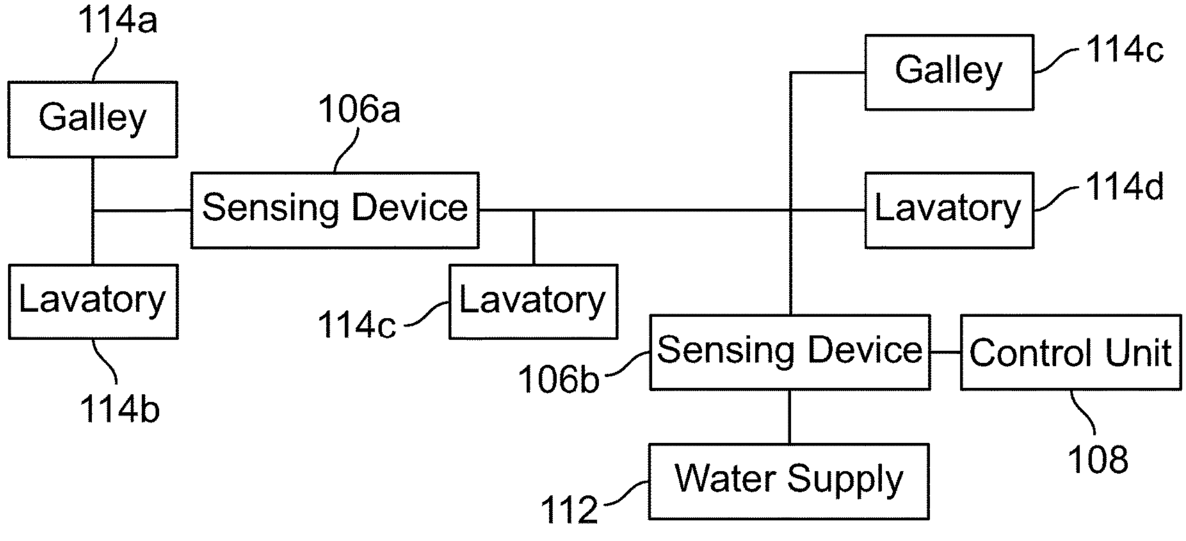
FIG. 5 illustrates a schematic block diagram of a leak detection system within an internal cabin of a vehicle, according to example of the present disclosure.

FIG. 5 illustrates a schematic block diagram of a leak detection system within an internal cabin of a vehicle, according to example of the present disclosure. As shown, the water-drawing components can be within a galley **114*a*, a lavatory 114*b*, a galley 114*c*, and a lavatory 114*d*. The system can include two sensing devices, namely sensing devices 106*a* and 106*b*. The sensing device 106*a* can be downstream from the sensing device 106*b***.

Figure 6:
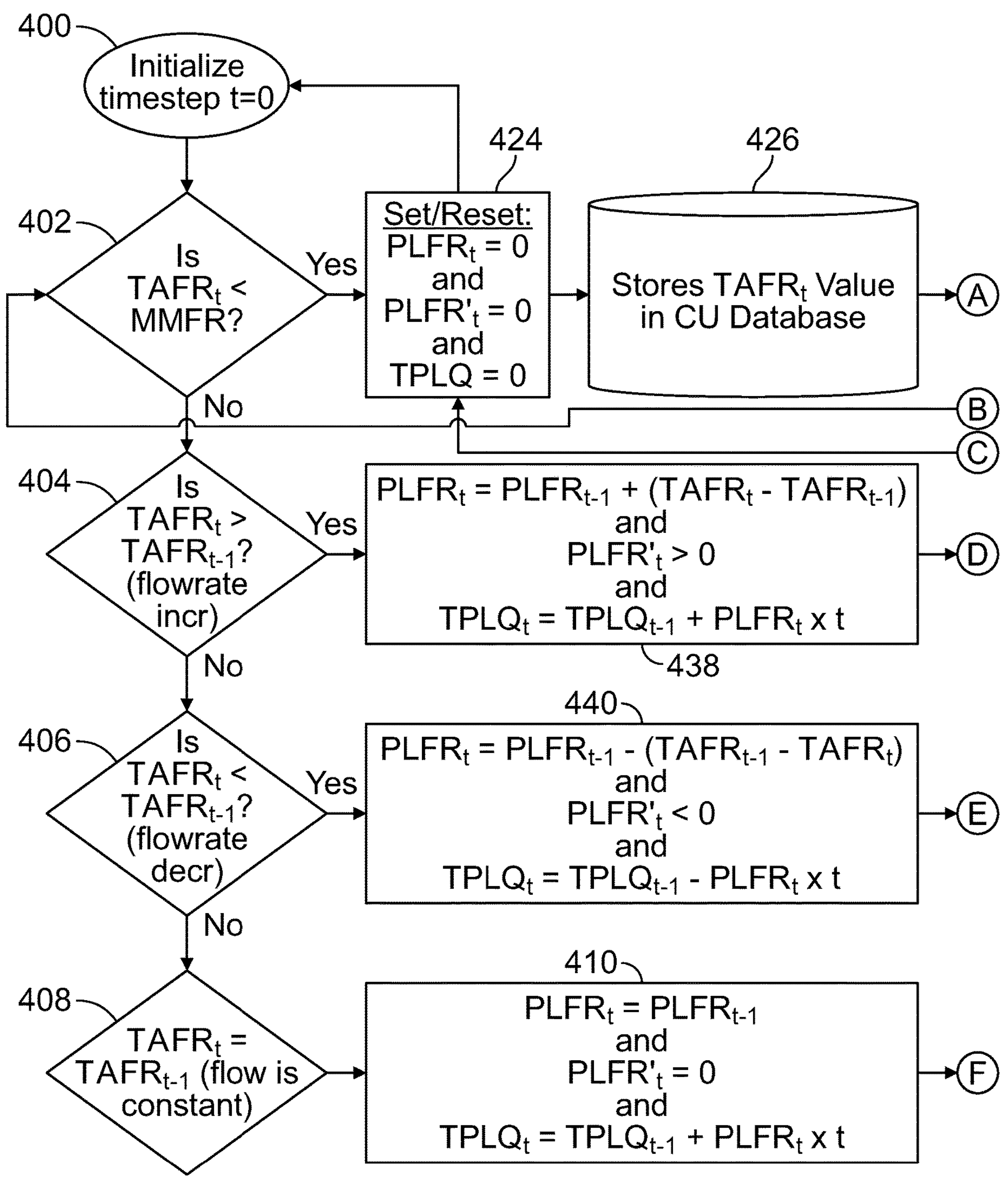
FIG. 6 illustrates a flow chart of a method, according to an example of the present disclosure.
Figure 6:
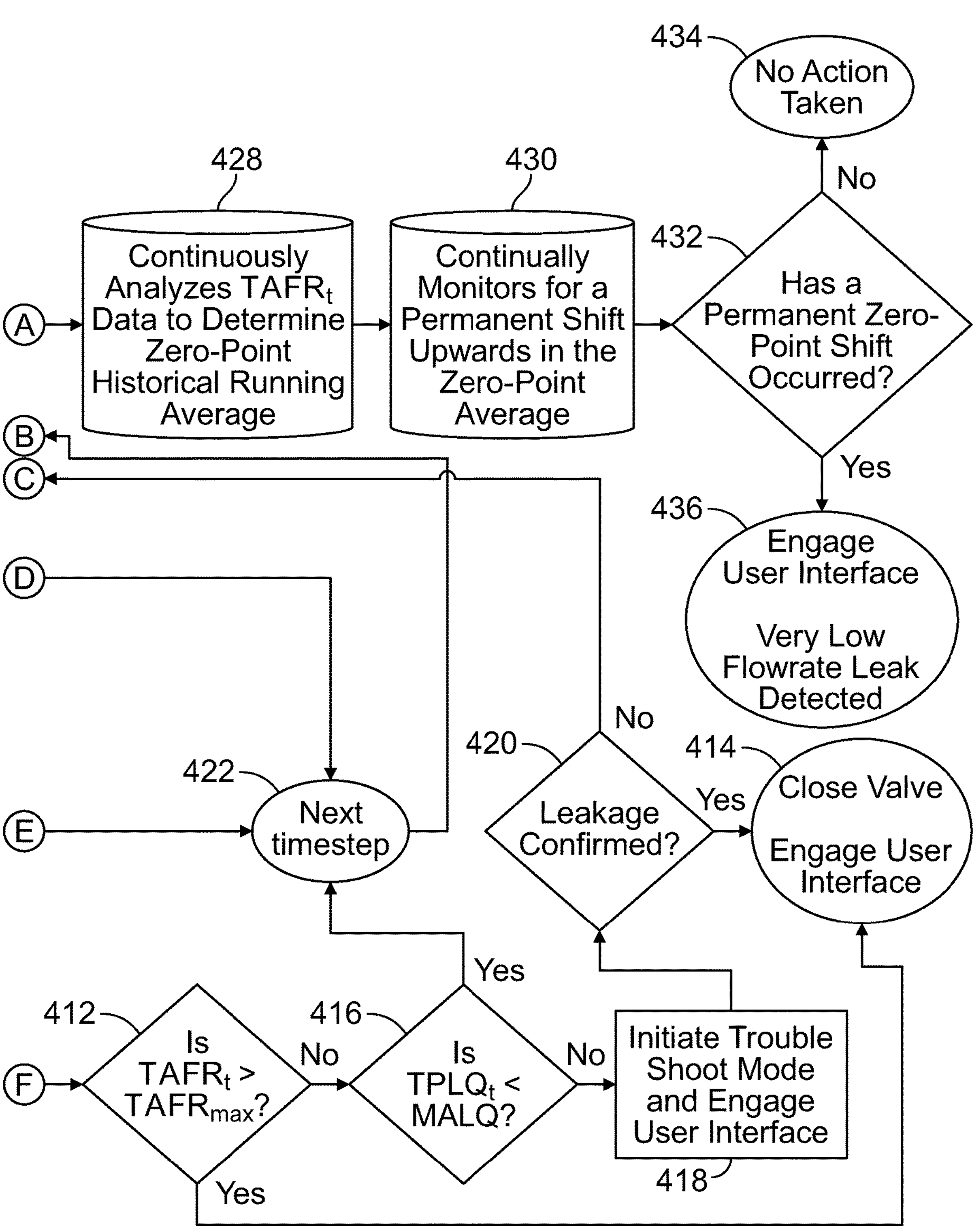

FIG. 6 illustrates a flow chart of a method, according to an example of the present disclosure. Referring to FIGS. 1 and 6, at 400, the control unit 108 initializes a timestep t=0. The control unit 108 determines a $\Delta TAFR_t$ value. At 402, the control unit 108 then determines if an area total (such as in a galley) flow rate at timestep t ($TAFR_t$) is less than a minimum measurable flow rate (MMFR), which is the minimum measurable flowrate accurately measurable by a device, such as the sensing device 106. If not, the method proceeds to 412 at which the control unit 108 determines if $TPLQ_t$ is greater than $TAFR_{max}$. If not, the method proceeds to 404, at which the control unit 108 determines if $\Delta TAFR_t$, is greater than zero (indicating a flowrate increase). If not, the method proceeds to 406, at which the control unit 108 determines if $\Delta TAFR_t$ is less than zero (indicating a flow rate decrease). If not, the method proceeds to 408, at which the control unit 108 determines if ΔTAFR (=zero (indicating a constant flowrate). Then, the method proceeds to 410 at which the control unit 108 determines that a possible leakage flow rate at timestep 1 ($PLFR_t$)=$PLFR_t$−1, and the total possible leakage quantity at timestep t ($TPLQ_t$) equals $TPLQ_t$−1 plus $PLFR_t$ multiplied by t. Then, all Active Accumulated Flow Quantities (AAFQ) are updated and stored in the control unit 108. Then, at 416, the control unit 108 determines if $TPLQ_t$ is less than MALQ. If not, the method proceeds to 418 at which the control unit 108 initiates a troubleshoot mode, and engages the user interface 414, at which upon leakage confirmation, the valve 120 is closed, and the user interface 122 is engaged.

If, however, at 402, $TAFR_t$ is less than MMFR, the control unit 108 sets or resets $PLFR_t$ and TPLQ values equal to zero, and also stores the measured $TAFR_t$ value in the control unit 108 database. The control unit 108 continuously analyzes $TAFR_t$ data that is less than MMFR to determine if a permanent shift in zero-point historical running average occurs, and if so determined, engages the user interface to communicate that a very low flowrate leak such as a slow drip leak has been detected requiring on-ground maintenance action.

Returning to 412, if $TAFR_t$ is greater than $TAFR_{max}$, the control unit 108 closes valve 120, initiates the troubleshoot mode, upon leakage confirmation keeps the valve 120 closed, or upon confirmation of no leakage, and the method proceeds to reset $PLFR_t$ and $TPLQ_t$ to zero.

Returning to 404, if $\Delta TAFR_t$ is greater than zero, the control unit 108 at 438 then determines that $PLFR_t$ equals $PLFR_t$−1 plus $\Delta TAFR_t$, and $TPLQ_t$ equals $TPLQ_t$−1 plus $PLFR_t$ multiplied by t. The method then proceeds to store new $\Delta TAFR_t$, and AAFQ(x) values or update existing values in the control unit 108.

Returning to 406, if $\Delta TAFR_t$ is less than zero, the control unit 108 identifies AAFQ(x) in an Active Flows Database that matches the ΔTAFRt, and further determines that $PLFR_t$ equals $PLFR_{t-1}$ plus $\Delta TAFR_t$ and $TPLQ_t$ equals $TPLQ_{t-1}$− AAFQ(x). The method then proceeds to update all stored AAFQ(x) values in the control unit 108.

Returning to 408, if $\Delta TAFR_t$ is equal to zero, the control unit 108 determines that $PLFR_t$ equals $PLFR_{t-1}$ and that $TPLQ_t$ equals $TPLQ_{t-1}$ plus $PLFR_t$ multiplied by t. The method then proceeds to update all stored AAFQ(x) values in the control unit 108.

Proceeding to 416, the control unit 108 determines if $TPLQ_t$ is less than a maximum allowable leakage quantity (MALQ). If not, the method proceeds to 418, at which the control unit 108 initiates a trouble shoot mode, and engages the user interface 122. The method then proceeds to 420, at which the control unit 108 confirms a leakage 420, and then the method proceeds to close the valve and engage user interface 414.

If, however, at 416, the control unit 108 determines that $TPLQ_t$ is less than MALQ, the method proceeds to 422, at which the control unit 108 moves to the next timestep, and the process repeats at the $\Delta TAFR_t$ calculation by the control unit 108.

Further, the disclosure comprises examples according to the following clauses:

Clause 1. A leak detection system for an internal cabin of a vehicle, the leak detection system comprising:
- a sensing device configured to detect one or both of water flow or water pressure within a water delivery conduit that is configured to deliver water to one or more water-drawing components within one or more areas of the internal cabin, wherein the sensing device is configured to detect one or both of the water flow or the water pressure into the one or more water-drawing components; and
- a control unit in communication with the sensing device, wherein the control unit is configured to:
  - monitor one or both of the water flow or the water pressure as detected by the sensing device, and
  - determine a presence of a leak in relation to the one or more water-drawing components based on one or both of the water flow or the water pressure.

Clause 2. The leak detection system of Clause 1, wherein the one or more areas comprise one or both of a galley or a lavatory.

Clause 3. The leak detection system of Clauses 1 or 2, wherein the sensing device is disposed on or within the water delivery conduit upstream from the one or more water-drawing components.

Clause 4. The leak detection system of any of Clauses 1-3, wherein the sensing device comprises one or both of a flow sensor or a pressure sensor.

Clause 5. The leak detection system of any of Clauses 1-4, wherein the sensing device comprises an ultrasonic sensor disposed on or within the water delivery conduit.

Clause 6. The leak detection system of any of Clauses 1-5, wherein the control unit is further configured to output an alert signal to a user interface in response to determining the presence of the leak.

Clause 7. The leak detection system of any of Clauses 1-6, wherein the control unit is further configured to automatically shut off flow of water to the one or more water-drawing components in response to determining the presence and/or a severity of the leak.

Clause 8. The leak detection system of any of Clauses 1-7, wherein the control unit is further configured to determine the presence of a leak based on one or both of the water flow or the water pressure in relation to one or more time thresholds related to normal use of the one or more water-drawing components.

Clause 9. The leak detection system of any of Clauses 1-8, wherein the leak detection system is devoid of device that is configured to detect flow or water out of the one or more water-drawing components.

Clause 10. The leak detection system of any of Clauses 1-9, wherein the leak detection system is devoid of a sensing device downstream from the one or more water-drawing components.

Clause 11. The leak detection system of any of Clauses 1-10, wherein the control unit is an artificial intelligence or machine learning system.

Clause 12. The leak detection system of any of Clauses 1-11, wherein the sensing device comprises:
- a first pressure transducer configured to detect water pressure within the water delivery conduit;
- a flow transducer configured to detect water flow within the water delivery conduit; and
- a second pressure device configured to detect water pressure within the water delivery conduit.

Clause 13. The leak detection system of Clause 12, wherein the sensing device further comprises a solenoid valve configured to be operated by the control unit to selectively open and close the water delivery conduit.

Clause 14. A vehicle comprising:

an internal cabin having one or more areas;

one or more water-drawing components within the one or more areas;

a water delivery conduit configured to deliver water to the one or more water-drawing components; and a leak detection system comprising:

a sensing device configured to detect one or both of water flow or water pressure within the water delivery conduit, wherein the sensing device is configured to detect one or both of the water flow or the water pressure into the one or more water-drawing components; and a control unit in communication with the sensing device, wherein the control unit is configured to:

monitor one or both of the water flow or the water pressure as detected by the sensing device, and determine a presence of a leak in relation to the one or more water-drawing components based on one or both of the water flow or the water pressure.

Clause 15. The vehicle of Clause 14, wherein the sensing device is disposed on or within the water delivery conduit upstream from the one or more water-drawing components.

Clause 16. The vehicle of Clauses 14 or 15, wherein the sensing device comprises an ultrasonic sensor disposed on or within the water delivery conduit.

Clause 17. The vehicle of any of Clauses 14-16, wherein the control unit is further configured to one or both of:

output an alert signal to a user interface in response to determining the presence of the leak, or automatically shut off flow of water to the one or more water-drawing components in response to determining the presence of the leak.

Clause 18. The vehicle of any of Clauses 14-17, wherein the control unit is further configured to determine the presence of a leak based on one or both of the water flow or the water pressure in relation to one or more time thresholds related to normal use of the one or more water-drawing components.

Clause 19. The vehicle of any of Clauses 14-18, wherein the leak detection system is devoid of device that is configured to detect flow or water out of the one or more water-drawing components, and wherein the leak detection system is devoid of a sensing device downstream from the one or more water-drawing components.

Clause 20. A leak detection method for an internal cabin of a vehicle, the leak detection method comprising:

detecting, by a sensing device, one or both of water flow rate or water pressure within a water delivery conduit that is configured to deliver water to one or more water-drawing components within one or more areas of the internal cabin, wherein said detecting comprises detecting one or both of the water flow or the water pressure into the one or more water-drawing components;

monitoring, by a control unit in communication with the sensing device, one or both of the water flow or the water pressure as detected by the sensing device; and determining, by the control unit, a presence of a leak in relation to the one or more water-drawing components based on one or both of the water flow or the water pressure.

Clause 21. The leak detection method of any of Clause 20, further comprising outputting, by the control unit, an alert signal to a user interface in response to determining the presence of the leak.

Clause 22. The leak detection method of Clauses 20 or 21, further comprising automatically shutting off, by the control unit, flow of water to the one or more water-drawing components in response to determining the presence of the leak.

Clause 23. The leak detection method of any of Clauses 20-22, wherein said determining comprises determining the presence of a leak based on one or both of the water flow or the water pressure in relation to one or more time thresholds related to normal use of the one or more water-drawing components.

Clause 24, the leak detection method of any of Clauses 20-23, wherein said determining comprises determining total area flow rate (TAFR), possible leakage flow rate (PLFR), total maximum area flow rate ($TAFR_{max}$), total possible leakage quantity (TPLQ), maximum allowable leakage quantity (MALQ), minimum measurable flow rate (MMFR), and active accumulated flow quantity (AAFQ).

As described herein, examples of the present disclosure provide systems and methods for effectively detecting water leaks within an internal cabin of an aircraft. Further, examples of the present disclosure provide efficient and effective systems and methods for detecting leaks within an area, such as within an internal cabin of a vehicle.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first." "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A leak detection system for an internal cabin of a vehicle, the leak detection system comprising:
- a sensing device configured to detect one or both of water flow or water pressure within a water delivery conduit that is configured to deliver water to one or more water-drawing components within one or more areas of the internal cabin, wherein the sensing device is configured to detect one or both of the water flow or the water pressure into the one or more water-drawing components; and
- a control unit in communication with the sensing device, wherein the control unit is configured to:
  - monitor one or both of the water flow or the water pressure as detected by the sensing device,
  - determine total area flow rate (TAFR), total maximum area flow rate ($TAFR_{max}$) possible leakage flow rate (PLFR), total possible leakage quantity (TPLQ), maximum allowable leakage quantity (MALQ), minimum measurable flow rate (MMFR), and active accumulated flow quantity (AAFQ), and
  - determine a presence of a leak in relation to the one or more water-drawing components based on one or both of the water flow or the water pressure.

2. The leak detection system of claim 1, wherein the one or more areas comprise one or both of a galley or a lavatory.

3. The leak detection system of claim 1, wherein the sensing device is disposed on or within the water delivery conduit upstream from the one or more water-drawing components.

4. The leak detection system of claim 1, wherein the sensing device comprises one or both of a flow sensor or a pressure sensor.

5. The leak detection system of claim 1, wherein the sensing device comprises an ultrasonic sensor disposed on or within the water delivery conduit.

6. The leak detection system of claim 1, wherein the control unit is further configured to output an alert signal to a user interface in response to determining the presence of the leak.

7. The leak detection system of claim 1, wherein the control unit is further configured to automatically shut off flow of water to the one or more water-drawing components in response to determining the presence of the leak.

8. The leak detection system of claim 1, wherein the control unit is further configured to determine the presence of a leak based on one or both of the water flow or the water pressure in relation to one or more time thresholds related to normal use of the one or more water-drawing components.

9. The leak detection system of claim 1, wherein the leak detection system is devoid of device that is configured to detect flow or water out of the one or more water-drawing components.

10. The leak detection system of claim 1, wherein the leak detection system is devoid of a sensing device downstream from the one or more water-drawing components.

11. The leak detection system of claim 1, wherein the control unit is an artificial intelligence or machine learning system.

12. The leak detection system of claim 1, wherein the sensing device comprises:
- a first pressure transducer configured to detect water pressure within the water delivery conduit;
- a flow transducer configured to detect water flow within the water delivery conduit; and
- a second pressure device configured to detect water pressure within the water delivery conduit.

13. The leak detection system of claim 12, wherein the sensing device further comprises a solenoid valve configured to be operated by the control unit to selectively open and close the water delivery conduit.

14. A vehicle comprising:
- an internal cabin having one or more areas;
- one or more water-drawing components within the one or more areas;
- a water delivery conduit configured to deliver water to the one or more water-drawing components; and
- a leak detection system comprising:
  - a sensing device configured to detect one or both of water flow or water pressure within the water delivery conduit, wherein the sensing device is configured to detect one or both of the water flow or the water pressure into the one or more water-drawing components; and
  - a control unit in communication with the sensing device, wherein the control unit is configured to:
    - monitor one or both of the water flow or the water pressure as detected by the sensing device,
    - determine total area flow rate (TAFR), total maximum area flow rate ($TAFR_{max}$), possible leakage flow rate (PLFR), total possible leakage quantity TPLQ), maximum allowable leakage quantity (MALQ), minimum measurable flow rate (MMFR), and active accumulated flow quantity (AAFQ), and
    - determine a presence of a leak in relation to the one or more water-drawing components based on one or both of the water flow or the water pressure.

15. The vehicle of claim 14, wherein the sensing device is disposed on or within the water delivery conduit upstream from the one or more water-drawing components.

16. The vehicle of claim 14, wherein the sensing device comprises an ultrasonic sensor disposed on or within the water delivery conduit.

17. The vehicle of claim 14, wherein the control unit is further configured to one or both of:
- output an alert signal to a user interface in response to determining the presence of the leak, or
- automatically shut off flow of water to the one or more water-drawing components in response to determining the presence of the leak.

18. The vehicle of claim 14, wherein the control unit is further configured to determine the presence of a leak based on one or both of the water flow or the water pressure in relation to one or more time thresholds related to normal use of the one or more water-drawing components.

19. The vehicle of claim 14, wherein the leak detection system is devoid of device that is configured to detect flow or water out of the one or more water-drawing components, and wherein the leak detection system is devoid of a sensing device downstream from the one or more water-drawing components.

20. A leak detection method for an internal cabin of a vehicle, the leak detection method comprising:

detecting, by a sensing device, one or both of water flow rate or water pressure within a water delivery conduit that is configured to deliver water to one or more water-drawing components within one or more areas of the internal cabin, wherein said detecting comprises detecting one or both of the water flow or the water pressure into the one or more water-drawing components;

monitoring, by a control unit in communication with the sensing device, one or both of the water flow or the water pressure as detected by the sensing device;

determining, by the control unit, a presence of a leak in relation to the one or more water-drawing components based on one or both of the water flow or the water pressure, wherein said determining comprises determining total area flow rate (TAFR), total maximum area flow rate ($TAFR_{max}$), possible leakage flow rate (PLFR), total possible leakage quantity (TPLQ), maximum allowable leakage quantity (MALQ), minimum measurable flow rate (MMFR), and active accumulated flow quantity (AAFQ).

21. The leak detection method of claim 20, wherein the sensing device comprises:

a first pressure transducer configured to detect water pressure within the water delivery conduit;

a flow transducer configured to detect water flow within the water delivery conduit; and a second pressure device configured to detect water pressure within the water delivery conduit.

22. A leak detection system for an internal cabin of a vehicle, the leak detection system comprising:

a sensing device configured to detect one or both of water flow or water pressure within a water delivery conduit that is configured to deliver water to one or more water-drawing components within one or more areas of the internal cabin, wherein the sensing device is configured to detect one or both of the water flow or the water pressure into the one or more water-drawing components, wherein the sensing device comprises:

a first pressure transducer configured to detect water pressure within the water delivery conduit;

a flow transducer configured to detect water flow within the water delivery conduit; and a second pressure device configured to detect water pressure within the water delivery conduit; and a control unit in communication with the sensing device, wherein the control unit is configured to:

monitor one or both of the water flow or the water pressure as detected by the sensing device, and determine a presence of a leak in relation to the one or more water-drawing components based on one or both of the water flow or the water pressure.

23. The leak detection system of claim 22, wherein the sensing device further comprises a solenoid valve configured to be operated by the control unit to selectively open and close the water delivery conduit.

* * * * *